(12) United States Patent
Hubbauer et al.

(10) Patent No.: US 6,254,280 B1
(45) Date of Patent: Jul. 3, 2001

(54) SUBSTRATE BASED ARRAY CONNECTOR

(75) Inventors: Philip Hubbauer, Millington; Louis Thomas Manzione, Summit, both of NJ (US)

(73) Assignee: Agere Systems Optoelectronics Guardian Corp., Orlando, FL (US)

(*) Notice: Subject to any disclaimer, the term of this patent is extended or adjusted under 35 U.S.C. 154(b) by 0 days.

(21) Appl. No.: 08/391,817

(22) Filed: Feb. 21, 1995

(51) Int. Cl.[7] ....................................... G02B 6/38
(52) U.S. Cl. ................................. 385/65; 385/59
(58) Field of Search ........................... 385/65, 83, 49, 385/54, 59, 63, 95, 99, 137

(56) References Cited

U.S. PATENT DOCUMENTS

| | | | |
|---|---|---|---|
| 4,046,454 | 9/1977 | Pugh, III | 385/59 |
| 4,475,790 | 10/1984 | Little | 385/55 |

FOREIGN PATENT DOCUMENTS

| | | | |
|---|---|---|---|
| 0171664 | 2/1986 | (EP) . | |
| 0271721 | * 6/1988 | (EP) | 385/65 |
| 2-67507 | * 3/1990 | (JP) | 385/65 |
| 020197804 | 8/1990 | (JP) . | |
| 4-245207 | * 9/1992 | (JP) | 385/49 |
| 4-245208 | * 9/1992 | (JP) | 385/49 |
| 4-340507 | * 11/1992 | (JP) | 385/49 |
| 5-45531 | * 2/1993 | (JP) | 385/49 |
| 5-66318 | * 3/1993 | (JP) | 385/49 |

\* cited by examiner

*Primary Examiner*—Hung N. Ngo
(74) *Attorney, Agent, or Firm*—Gibbons, Del Deo, Dolan, Griffinger & Vecchione

(57) ABSTRACT

An optical fiber cable connector assembly comprising two connectors each of which is comprised of a rigid inorganic body which is coated with an organic layer into which grooves are formed which are adapted to restrain the ends of two fiber optic cables. One connector is adapted to fit over the other when inverted to form the assembly with one or more fiber optic cables restrained between them.

20 Claims, 5 Drawing Sheets

SUBSTRATE BASED ARRAY CONNECTOR

BACKGROUND OF THE INVENTION

1. Field of the Invention

This invention relates to optical communication fiber connectors, and in particular to connectors for a plurality of optical fibers which are stabilized by a substrate.

2. Description of Related Art

The efficient movement and management of information now requires local area networks within buildings and wide area networks across the nation which provide on-line access to data bases and communications services. The concept of an information highway is developing into hardware which will provide wide bandwidth services to every home. Optical fibers provide great bandwidth which is capable of distributing multimedia services in a noise-free and secure network. The distribution of these services will take place in the loop plant of local telephone companies, or others in competition with them, to connect nearly every home and office to the information highway.

A variety of optical fiber designs already exist together with connectors for them. The fibers may be designed for single-mode or multi-mode transmission with cladding or outer diameters of 125 microns and core diameters of approximately five microns or 65 microns, respectively (one micron equals one millionth meter). Other core and cladding diameters are feasible.

There are coupling losses when an optical fiber needs to be connected to another optical fiber or to an opotelectronic apparatus. A permanent connection whereby the glass fibers are butt-fused together with a flame is impractical for most applications. For non-permanent connections, losses in the connection arise from misalignment of the two axes by being off-axis with one another, by having their axes at an angle to one another, by having their ends separated by too great a distance, or any combination of these three. Another possibility for loss is the mismatch between the refractive index of the fibers and an intervening air gap which is left between the ends of the fibers. This loss is often minimized by an index-matching gel or silicone fluid which fills the gap.

The requirements placed upon the connector are, therefore, to locate the axes within plus or minus 0.5 microns or plus or minus two microns of each other, depending upon the mode, and to maintain angular orientation of the two axes to within a few degrees. These tolerances are required to keep the loss per connection to less than a few tenths of a decibel. These tolerances become tighter as the number of connectors in series increases.

Micron type tolerances are common in semiconductor processing, and there is an embedded base of fiber optic connectors which take advantage of semiconductor fabrication tolerances and the ability to etch grooves into silicon to form V-groove connectors which keep an array of optical fibers accurately spaced apart. In addition to accurate spacing, the silicon member provides dimensional stability because it has a low coefficient of thermal expansion and because it is insensitive to moisture. Both of these properties are important in the environment of the loop plant where temperatures can range from −40 degrees Fahrenheit to 160 degrees in a cable vault, and where the connector could be under water. So there is a well working etched silicon connector technology, but it is very expensive when considering all the connectors in series from a source to the final piece of apparatus.

Naturally, attempts have been made to reduce this cost by using the precision of an etched silicon master to electroform a molding die for plastic connectors. Their construction consists of a pair of ferrules with a gum boot, two guide pins that align the ferrules to each other, and a clamp spring which holds the assembly together. Reliance upon the guide pins penetrating two plastic bodies for precise location lowers the coupling efficiency, and therefore the yield, for single mode fiber connections. The thermal expansion of the plastic body, typically 16 parts per million per degree Centigrade, does not match the embedded base of etched silicon connectors whose expansion is 2.3 ppm/deg. C. These connectors do lower cost, typically by 50%, but they are susceptible to dimensional changes as both temperature and humidity cycle in the conditions which are typical in the loop plant. The release of residual molding stresses may also cause warp in the plastic over time.

Accordingly, there is an increased need for a moderate cost optical fiber connector which precisely locates the axes of the fibers and which maintains that alignment in hostile environmental conditions. Additionally, the connector should more closely match the thermal expansion of the embedded base of etched silicon connectors.

3. SUMMARY OF THE INVENTION

The present invention relates to connectors which restrain optical fibers in a manner which provides precise alignment, hence less coupling loss, and which maintains this alignment over time and with large variations in temperature and humidity. The required dimensional stability is achieved by using a rigid substrate whose relative thickness, modulus of elasticity, and coefficient of thermal expansion are selected to dominate the mechanical characteristics of the connector.

The optical fibers are restrained by features which are formed into or are defined by a thin layer of an encapsulant which is supported by the rigid substrate. The precision of these features is controlled by a molding die which repeats these features over a large number of connectors to reduce cost. These features may be in the form of a V-groove formed into the encapsulant by the molding die so that two optical fibers lie in the same V-groove with their ends facing one another.

In one embodiment of the invention, a feature such as a V-groove, or a series of them, is defined by an encapsulant which is supported by the upper surface of the substrate.

In another embodiment of the invention, the encapsulant surrounds the substrate and defines a feature on its outer surface which is adapted to restrain an optical fiber.

In a further embodiment of the invention, a rigid cover overlaps and restrains optical fibers which are held by V-grooves in an encapsulant covering a substrate.

In yet another embodiment of the invention, a metal lead frame is attached to a substrate to aid in the mass production molding of a surrounding encapsulant which defines features on its outer surface with the precision of a molding die.

In still another embodiment of the invention, the lead frame and substrate are made from the same material and are integral with each other. The encapsulant is them molded around the combination in the operation which defines the features.

In another embodiment of the invention, two substrate-encapsulant connectors are inverted to one another so that their features align to form a nearly closed cavity which restrains an optical fiber. Securing means may hold the connectors together.

These and other features and advantages of the invention will be better understood with consideration of the following detailed description of the preferred embodiments taken in conjunction with the accompanying drawings.

4. BRIEF DESCRIPTION OF THE DRAWINGS

FIGS. 1A, and 1B, are sectional views of two embodiments of the invention;

Figure 4A:
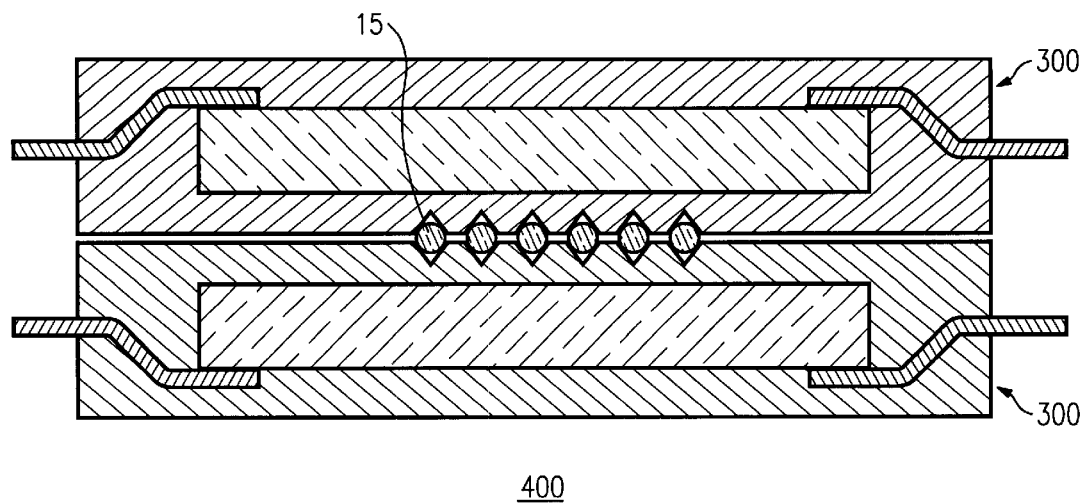
Figure 4B:
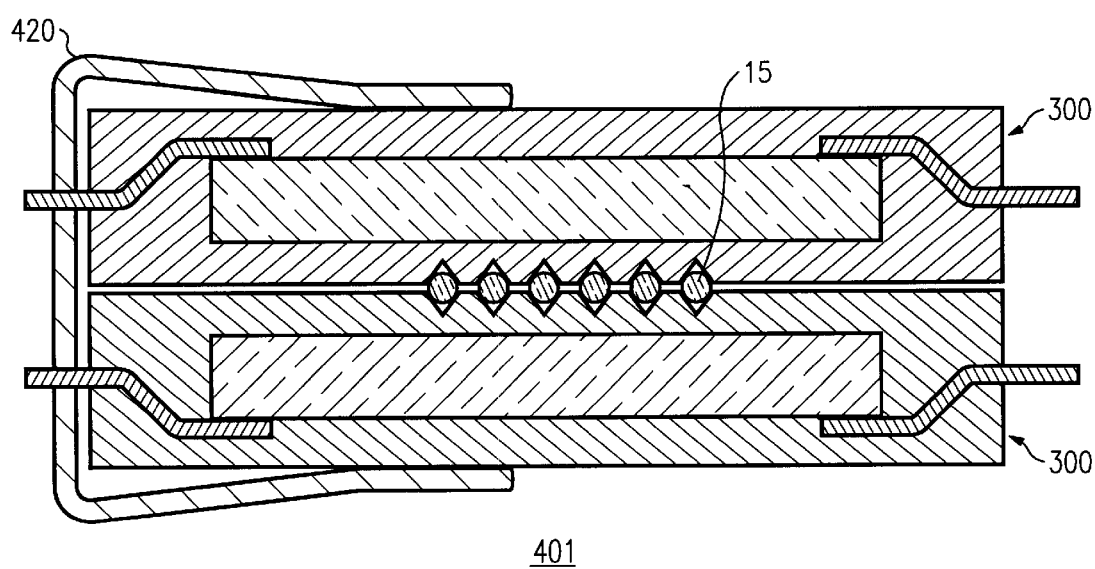
Figure 4C:
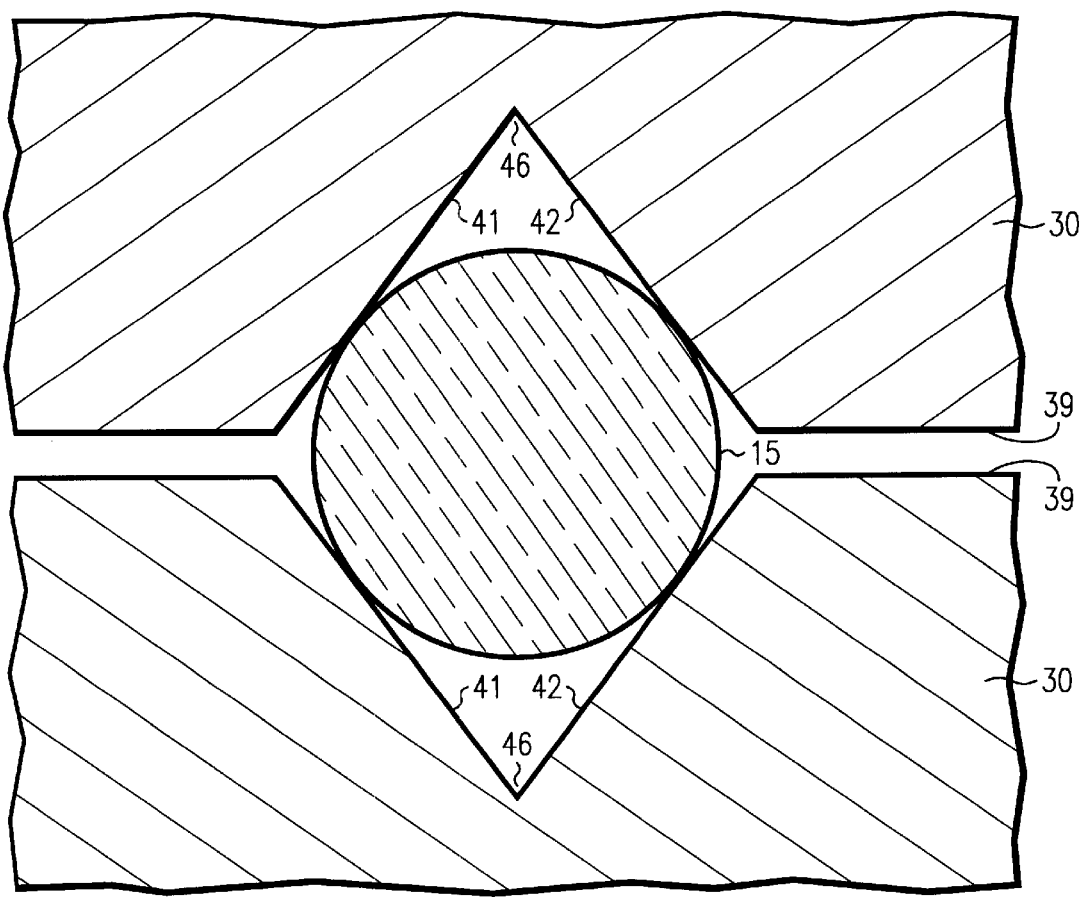

FIGS. 4A, 4B, and 4C are sectional views of connector assemblies in accordance with other embodiments of the invention.

The drawings are not to scale.

5. DETAILED DESCRIPTION OF THE EMBODIMENTS

Figure 1A:
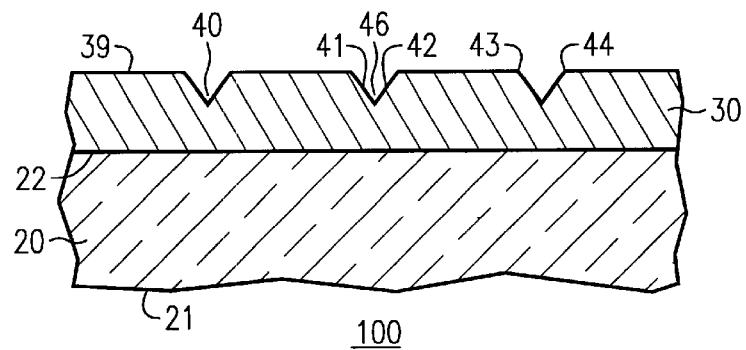
FIG. 1C is a perspective view of optical fibers being restrained by a groove in a connector.

Referring now to FIG. 1A, there is shown apparatus 100 in accordance with one embodiment of the invention. Substrate 20 has an upper surface 22, and a lower surface 21. The upper surface 22 of the substrate supports encapsulant 30 which has an outer surface 39 which is generally planar except for one or more features 40 which are adapted to restrain an optical fiber. The features may protrude from the planar surface, but in this embodiment of the invention they are formed into the thickness of the encapsulant to define a V-groove with a first side 41 and a second side 42 which meet at apex 46 to define an included angle which may be from 45 to 120 degrees. Sides 41 and 42 are generally planar, extend upward to intersect the outer surface at intersections 43 and 44, respectively, and are sized to accommodate the ends of round cylindrical optical fibers so that the ends of the fibers face each other in close proximity.

Figure 1B:
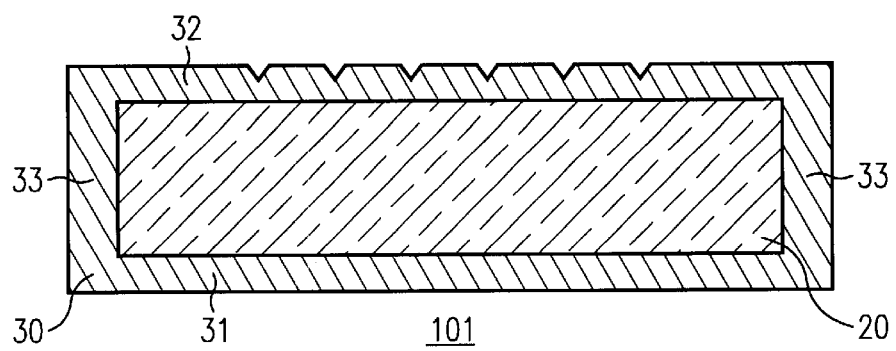

Referring now to FIG. 1B, there is shown apparatus 101 in accordance with another embodiment of the same invention wherein encapsulant 30 completely surrounds substrate 20 so that lower web 31 and upper web 32 of the encapsulant have approximately the same thickness. End sections 33 cover the sides of the substrate. The same reference numbers apply to elements which are common to the various embodiments of this invention.

Figure 1C:
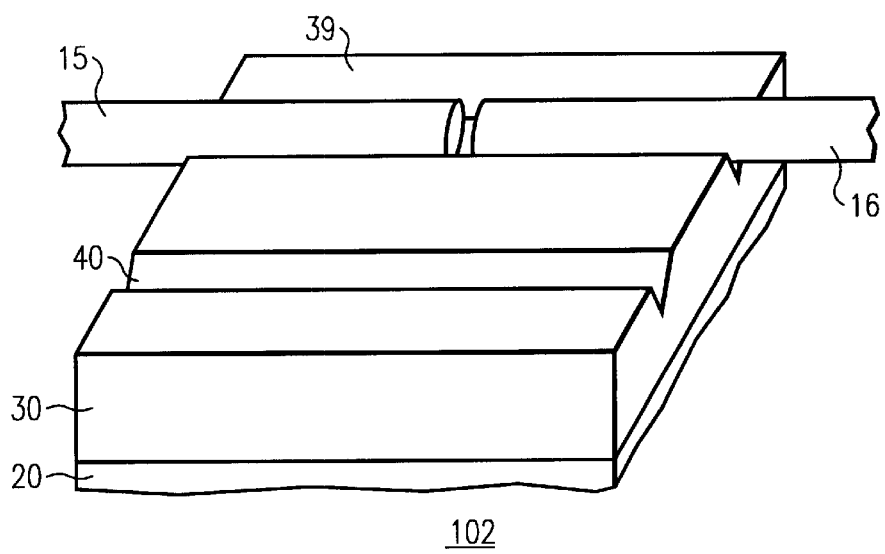

Referring now to FIG. 1C, there is shown apparatus 102 which is a perspective view of optical fibers 15 and 16 being restrained by one of the features 40, a V-groove in this case, which are formed into the outer surface 39 of the encapsulant.

Figure 2:
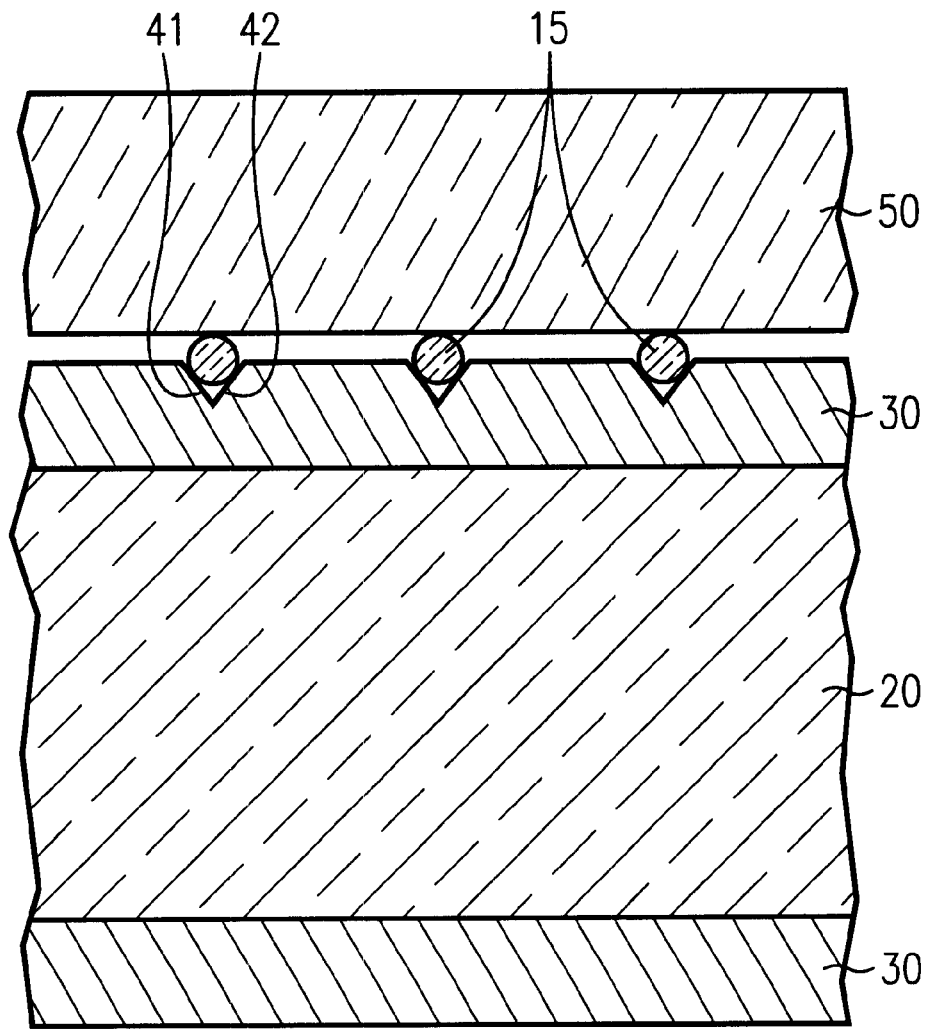
FIG. 2 is a sectional view of apparatus in accordance with another embodiment of the invention.

Referring now to FIG. 2, there is shown apparatus 200 which is a side view of another embodiment of the invention wherein optical fibers 15 are shown restrained by sides 41 and 42 of a V-groove which is formed into the thickness of encapsulant 30. Rigid cover 50 further restrains the conductors from leaving the V-groove. This cover does not exert any lateral force that could shift the positions of the optical fibers in the V-grooves. Preferably, the thermal expansion of cover 50 approximates or matches that of substrate 20. Typical materials with low thermal expansion characteristics include silicon, ceramics, and glasses.

Figure 3A:
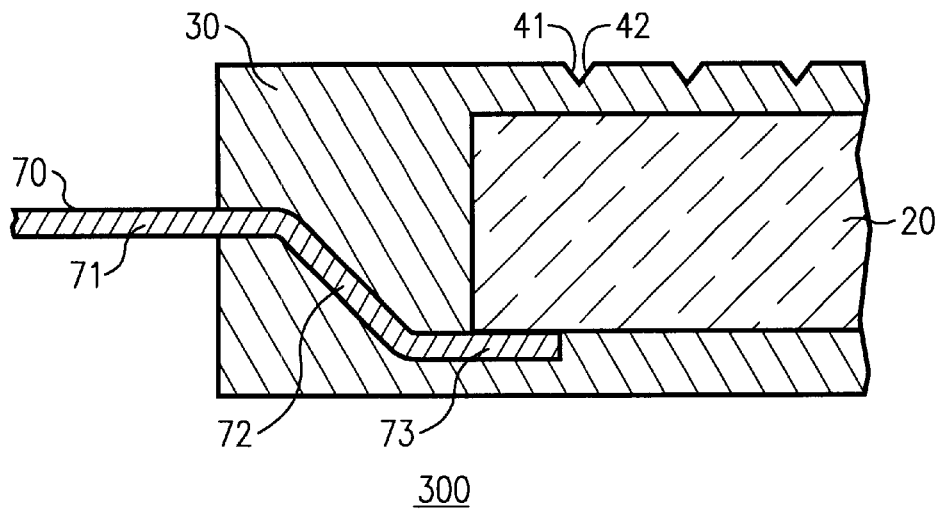
FIGS. 3A and 3B are sectional views of other embodiments of the invention.

Referring now to FIG. 3A, there is shown apparatus 300 which is a side view of another embodiment of the invention wherein a metal lead frame 70, being comprised of an outer planar section 71, an offset section 72, and a tab section 73, is bonded to the lower surface of the substrate. The purpose of the offset section is to locate the center of substrate 20 on the same plane as the neutral axis (not shown) of the composite while the outer sections of the lead frame 70 are clamped at the parting line of the molding tool (not shown). Encapsulant 30 surrounds both the substrate, the tab section, the offset section, and a part of the outer section of the lead frame.

Figure 3B:
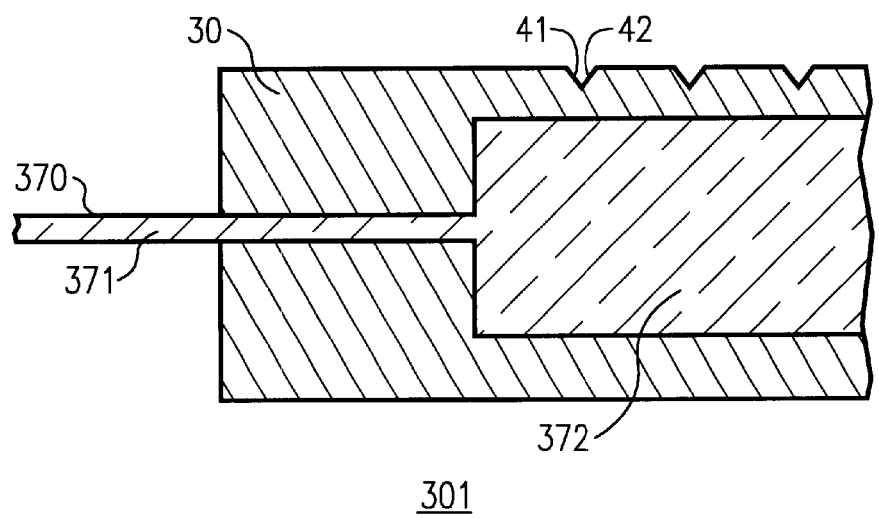

Referring now to FIG. 3B, there is shown apparatus 301 in accordance with another embodiment of the invention wherein metal lead frame 370 is comprised of an outer section 371 which is similar to outer section 71 of apparatus 300. A substrate section 372 is connected to outer section 371 but is thicker than the outer section or encapsulant 30, so that section 372 dominates the dimensional behavior of apparatus 301.

Referring now to FIG. 4A, there is shown apparatus 400 in accordance with another embodiment of the invention wherein two of the connectors described as apparatus 300 above are disposed to restrain one or more optical fibers 15. Means for securing apparatus 400 together is shown as element 420 in FIG. 4B, which together with two apparatus 300 constitute apparatus 401. This means may be a clamp, a fastener, a latch, a sleeve, or any of the securing devices which are well known in the art. Apparatus 300 may not be identical to each other, as shown, but could differ in that one contains a pin and the other a receptacle which could also secure them together.

The operation of the embodiments described above is predicated upon the rigidity and stability of the substrate with excursions of time, temperature, and humidity; and the ease of precisely forming the features, such as V-grooves, in the encapsulant so that even single-mode fibers are held to a tolerance of plus or minus 0.5 micron in the conditions of the loop plant.

In a preferred embodiment the substrate is made of silicon whose coefficient of thermal expansion is 2.3 ppm/deg. C., which matches that of many connectors already in use. The requirements of the substrate material are that it be rigid, have a low coefficient of thermal expansion, be dimensionally stable in humid environments, be chemically inert over long periods of time, and not release any residual stress which could cause dimensional change or warp. These requirements argue strongly for an inorganic material such as silicon, a ceramic, or a glass. Silicon has all these properties and matches an embedded base of connectors in use. It need not be single crystal silicon, because its expansion is controlled more by its lattice type than by its crystallographic orientation, and it need not be doped or polished as in semiconductor fabrication. Indeed, scrap silicon from the semiconductor industry could be used here to further lower the cost of fabricating this invention. Other possible materials include ceramics such as alumina which has a thermal expansion of 6.4 ppm/deg. C., or glasses which have low thermal expansion such as those known under the trade names of Pyrex (3.2 ppm/deg. C.), Vicor (0.8 ppm/deg. C.) or fused silica (0.6 ppm/deg. C.). The alloy commercially known as "Kovar" has a thermal expansion coefficient (5 ppm/deg. C.) which matches ceramics and could also be used as a substrate material and for the lead frame-substrate combination shown in FIG. 3B. The alloy known as "Invar" has a thermal expansion coefficient of 1.5 ppm/deg. C. and it could also be a useful substrate material.

The dimensions of the substrate are selected so that the mechanical properties of the connector are dominated by the substrate. Preferably the substrate is 20 mils thick and the encapsulant thickness is below 10 mils over the broad planar surfaces that cover the upper and lower surfaces of the substrate. The encapsulant may be any organic material, a preferred embodiment being an epoxy molding compound whose viscosity is below 200 poise at its flow temperature. A biphenyl epoxy flows at 170 degrees C. and is well adapted to molding operations for thin small orientation packaging which is common in the semiconductor industry. The thickness and modulus of elasticity of the substrate dominate the mechanical behavior and stability of the apparatus when compared to the properties and thickness of the encapsulant. This advantage satisfies the needs of precisely maintaining the location of the axes of optical fibers in hostile environments while also matching the thermal expansion properties of connectors already used in the industry. Thermal shock and temperature cycling tests have established the reliability of this configuration for external use.

The lead frame which is attached to the substrate is typically 6 mil thick copper alloy and is a device which is borrowed from semiconductor packaging to mass produce these connectors with lead frame strips of multiple substrate sites to reduce cost. The bonding to the substrate may be by adhesive, soldering, or thermo-compression bonding which is common in electronic packaging operations. The bonding may be eliminated if the function of the lead frame and substrate were performed by a metal, typically a low expansion alloy, such as "Kovar", where elements 371 and 372 of apparatus 301 are stamped in one operation. Spools of substrates held together by the lead frame are then fed into the molding operation where the features, such as V-grooves are formed into the outer surface of the encapsulant. The precision in locating the features is built into the molding die, which may be electroformed from a master of silicon which has been photolithographically etched to micron tolerances which are commonly achieved in semiconductor processing. This cost is amortized over many molded connectors, so there is a cost advantage in practicing this invention over the connectors which are machined or prepared by individually etching each connector component.

Referring now to FIG. 4C, there is shown an enlarged view of an optical fiber 15 being restrained by encapsulants 30. The features which are molded into the encapsulant are typically sides 41 and 42, which are generally planar, and which meet at apex 46 to define an angle from 45 to 120 degrees. The molding die which creates these features may be created by electroforming where single crystal silicon is anisotropically etched to create a master. A characteristic apex angle is determined by the orientation of the silicon crystal. In a preferred embodiment this angle is 70.6 degrees at apex 46 and the depth of the feature is about 96 microns. For single mode and multimode optical fibers the outer diameter is 5 mils (125 microns) and sides 41 and 42 are approximately 117 microns wide, and the gap defined by opposing surfaces 39 is approximately 25 microns. Clearly, other widths and angles may be used to achieve line contact at four points around the circumference of each optical fiber.

Changes and modifications in the specifically described embodiments can be carried out without departing from the scope of the invention. In particular, the substrate could be a round mandrel around which an encapsulant is molded which defines grooves that contain optical fibers which could be further restrained by a sleeve which covers them. The molding compound may be selected from a wide variety of organic materials. The specific dimensions of the various elements or their ratios may be altered to meet particular design criteria. The features need not be confined to V-grooves, they could have rounded bottom apexes or they may protrude from the upper surface of the encapsulant in a configuration which restrains the fibers from lateral movement with a line contact. A metal alloy may be used for the substrate which has a thermal expansion characteristic which matches that of connectors already in use.

We claim:

1. A connector for an optical fiber comprising:
   a rigid rectangular substrate having a substantially planar upper surface;
   an encapsulant surrounding the substrate;
   a feature, disposed within the encapsulant above the upper surface of the substrate, for receiving at least part of the optical fiber therein and retaining the optical fiber in a fixed orientation with respect to the substrate; and
   a rigid cover, disposed above the feature, that contacts the optical fiber and restrains the optical fiber in the feature, wherein the feature is a groove.

2. The connector of claim 1 wherein the groove is defined by flat sides which intersect at an angle ranging from 45 degrees to 120 degrees.

3. An alignment structure for an optical fiber comprising:
   a rigid rectangular substrate having a substantially planar upper surface;
   a lead frame attached to the substrate;
   an encapsulant surrounding the substrate and a portion of the lead frame which is nearest to the substrate; and
   a feature, disposed within the encapsulant above the upper surface of the substrate, for receiving at least part of the optical fiber therein and retaining the optical fiber in a fixed orientation with respect to the substrate.

4. The alignment structure of claim 3 wherein the substrate includes an inorganic material.

5. The alignment structure of claim 4 wherein the substrate is selected from the group consisting of silicon, ceramics, and glass.

6. The alignment structure of claim 3 wherein the encapsulant includes an organic material.

7. The alignment structure of claim 3 wherein the encapsulant includes an epoxy compound.

8. The alignment structure of claim 3 wherein the feature is a groove.

9. The alignment structure of claim 8 wherein the groove is defined by flat sides which intersect at an angle ranging from 45 degrees to 120 degrees.

10. The alignment structure of claim 3 wherein the lead frame is coupled to an exterior surface of the substrate between the substrate and the encapsulant, wherein the lead extends through the encapsulant to a point external of the encapsulant.

11. An alignment structure for an optical fiber comprising:
    a metal lead frame having an outer section and a substrate section, wherein the substrate section has a first thickness;
    an organic encapsulant surrounding the substrate section of the lead frame, wherein the encapsulant has a second thickness; and
    a V-groove disposed within the encapsulant, wherein the V-groove is adapted to receive the optical fiber;
    wherein the first thickness of the substrate section exceeds the second thickness of the encapsulant whereby the substrate dominates the mechanical and dimensional properties associated with the connector.

12. An optical fiber cable connector assembly comprising two connectors wherein each connector comprises:

a rigid rectangular substrate having a substantially planar upper surface and a substantially planar lower surface;

a lead frame attached to the lower surface of the substrate;

an encapsulant surrounding the substrate and a portion of the lead frame nearest to the substrate; and a feature, disposed within the encapsulant above the upper surface of the substrate, for receiving at least part of the optical fibers therein;

wherein one connector is inverted and positioned adjacent the other thereby aligning each feature and forming a cavity which is adapted to restrain the optical fibers.

13. The optical fiber cable connector assembly of claim 12 wherein the substrate includes an inorganic material.

14. The optical fiber cable connector assembly of claim 13 wherein the substrate is selected from the group consisting of silicon, ceramics, and glass.

15. The optical fiber cable connector assembly of claim 12 wherein the encapsulant includes an organic material.

16. The optical fiber cable connector assembly of claim 12 wherein the encapsulant includes an epoxy compound.

17. The optical fiber cable connector assembly of claim 12 wherein the feature is a groove.

18. The optical fiber cable connector assembly of claim 17 wherein the groove is defined by flat sides which intersect at an angle ranging from 45 degrees to 120 degrees.

19. The optical fiber cable connector assembly of claim 12 wherein the lead frame is coupled the substrate between the substrate and the encapsulant, wherein the lead extends through the encapsulant to a point external of the encapsulant.

20. The optical fiber cable connector assembly of claim 12 further comprising means for securing the two connectors together.

* * * * *